United States Patent
Lu

(10) Patent No.: US 7,529,952 B2
(45) Date of Patent: May 5, 2009

(54) PROCESSING METHOD AND SYSTEM FOR RESETTING SYSTEM POWER STATE AFTER RECOVERING POWER SUPPLY TO COMPUTER PLATFORM

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 491 days.

(21) Appl. No.: 11/391,923

(22) Filed: Mar. 28, 2006

(65) Prior Publication Data
US 2007/0157047 A1    Jul. 5, 2007

(30) Foreign Application Priority Data
Dec. 29, 2005    (TW) .............. 94147167 A

(51) Int. Cl.
*G06F 1/30*    (2006.01)
(52) U.S. Cl. .................... 713/300; 710/104
(58) Field of Classification Search ............ 713/310, 713/300; 710/104
See application file for complete search history.

(56) References Cited

U.S. PATENT DOCUMENTS 7,228,444 B2 *    6/2007    Westerinen et al. ......... 713/300

OTHER PUBLICATIONS

Advanced Configuration and Power Inferface Specification, Revision 3.0a, Dec. 30, 2005.*
Intel 882801DB I/O Controller Hub 4 (ICH4) Datasheet, May 2002.*

* cited by examiner

*Primary Examiner*—Thomas Lee
*Assistant Examiner*—Albert Wang
(74) *Attorney, Agent, or Firm*—Jianq Chyun IP Office

(57) ABSTRACT

A computer platform system power state management method and system is proposed, which is designed for use with a computer platform for providing the computer platform with an after-G3 system power state management function, which is characterized by the use of BIOS (Basic Input/Output System) module's SMI (System Management Interrupt) handling functions for setting the internal power-restoration (AFTER_G3) state flag of a Southbridge module for the restoration of the computer platform to original ACPI (Advanced Configuration and Power Interface) system power states (S0, S4, S5) after an abnormal power interruption. This feature allows the computer code that implements the proposed method and system to have a cross-platform capability for use on low-end computer platforms that are unequipped with BMC (Baseboard Management Controller) and SIO (Super Input/Output).

12 Claims, 3 Drawing Sheets

PROCESSING METHOD AND SYSTEM FOR RESETTING SYSTEM POWER STATE AFTER RECOVERING POWER SUPPLY TO COMPUTER PLATFORM

BACKGROUND OF THE INVENTION

1. Field of the Invention

This invention relates to information technology (IT), and more particularly, to a computer platform system power state management method and system which is designed for use in conjunction with a computer platform, such a network server, a desktop computer, or a notebook computer, for providing the computer platform with an after-G3 (i.e., restoration of power after abnormal interruption) system power state management function that allows the computer platform's system power state to be automatically restored to the original state prior to the power interruption.

2. Description of Related Art

ACPI (Advanced Configuration and Power Interface) is a high-performance computer configuration and power management technology which is now widely utilized on various types of computer platforms, including network servers, desktop computers, and notebook computers, for efficient power management on the computer platform.

For power management, the ACPI specification sets forth 4 global states (respectively denoted by G0, G1, G2, and G3) and 6 system power states (respectively denoted by S0, S1, S2, S3, S4, and S5). In particular, the G3 global state is used to represent that the computer platform is currently inoperable due to power interrupt or shutoff, and the system power states S0, S1, S2, S3, S4, and S5 are used to represent the following conditions:

S0: On
S1: Power On Suspend
S2: Pseudo-Suspend to RAM
S3: Suspend to RAM
S4: Suspend to Disk (Hibernate)
S5: Soft off Since ACPI is a well-known standard in the computer industry, detailed descriptions about these states G3 and S0-S5 can be found in the ACPI specification so that details thereof will not be given in this specification.

During operation of a computer platform, if a power interruption occurs due to a failure in the power supply or user-intended shutoff, the computer platform's ACPI global state will be set to G3. When power restores to the computer platform after the G3 power interruption, it is required to reset the computer platform's system power state to the original state prior to the power interruption. In the document, the system power state after power restoration is technically referred to as "After G3" state. For example, if the computer platform is set in (S0, S1) system power state when the G3 condition occurs, then after power restoration, the computer platform should be set to (S0); and on the other hand, if the computer platform is set in (S4, S5) when the G3 condition occurs, then after power restoration, the computer platform should be set to (S4, S5).

A conventional method for setting after-G3 system power state is to utilize a BMC (Baseboard Management Controller) module or an SIO (Super Input/Output) module installed in the computer platform to perform an after-G3 system power state resetting procedure for resetting the computer platform's after-G3 system power state to the original state after abnormal power interruption.

One drawback to the above-mentioned method, however, is that it is only suitable for use on computer platforms equipped with BMC and SIO (which are typically high-end network servers), and unsuitable for use on low-end computer platforms that are unequipped with BMC and SIO.

SUMMARY OF THE INVENTION

It is therefore an objective of this invention to provide a computer platform system power state management method and system which has a cross-platform capability for use on low-end computer platforms that are unequipped with BMC and SIO.

The computer platform system power state management method and system according to the invention is designed for use in conjunction with a computer platform, such a network server, a desktop computer, or a notebook computer, for providing the computer platform with an after-G3 system power state management function that allows the computer platform's system power state to be automatically restored to the original state prior to the power interruption.

The computer platform system power state management method according to the invention comprises: (1) responding to a power-restoration event that occurs after an event of a power interruption on the computer platform by performing a power-on mode setting procedure for setting the internal power-restoration state flag of the input/output control unit to a power-on mode value; (2) responding to a power-button pressing event by performing a power-button pressing event handling procedure via the startup control unit's System Management Interrupt handling mechanism for setting the power-restoration state flag of the input/output control unit to a shut-off mode value; and (3) responding to a sleep-type enabling event by performing a sleep-type enabling event handling procedure the startup control unit's System Management Interrupt handling mechanism for setting the internal power-restoration state flag of the input/output control unit to a shut-off mode value, and setting the computer platform to a system power state based on the current sleep-mode value stored in a sleep-type register.

In architecture, the computer platform system power state management system according to the invention is based on an object-oriented component model which comprises: (A) a power-restoration responding module, which is capable of responding to a power-restoration event that occurs after an event of a power interruption on the computer platform by performing a power-on mode setting procedure for setting the internal power-restoration state flag of the input/output control unit to a power-on mode value; (B) a power-button pressing responding module, which is capable of responding to a power-button pressing event by performing a power-button pressing event handling procedure via the startup control unit's System Management Interrupt handling mechanism for setting the power-restoration state flag of the input/output control unit to a shut-off mode value; and (C) a sleep-type enabling responding module, which is capable of responding to a sleep-type enabling event by performing a sleep-type enabling event handling procedure the startup control unit's System Management Interrupt handling mechanism for setting the internal power-restoration state flag of the input/output control unit to a shut-off mode value, and setting the computer platform to a system power state based on the current sleep-mode value stored in a sleep-type register.

The computer platform system power state management method and system according to the invention is characterized by the use of BIOS module's SMI (System Management Interrupt) handling functions for setting the internal AFTER_G3 state flag of a Southbridge module for the restoration of the computer platform to original ACPI system power states (S0, S4, S5) after an abnormal power interruption. This feature allows the invention to have a cross-platform capability for use on low-end computer platforms that are unequipped with BMC and SIO.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The computer platform system power state management method and system according to the invention is disclosed in full details by way of preferred embodiments in the following with reference to the accompanying drawings.

Figure 1:
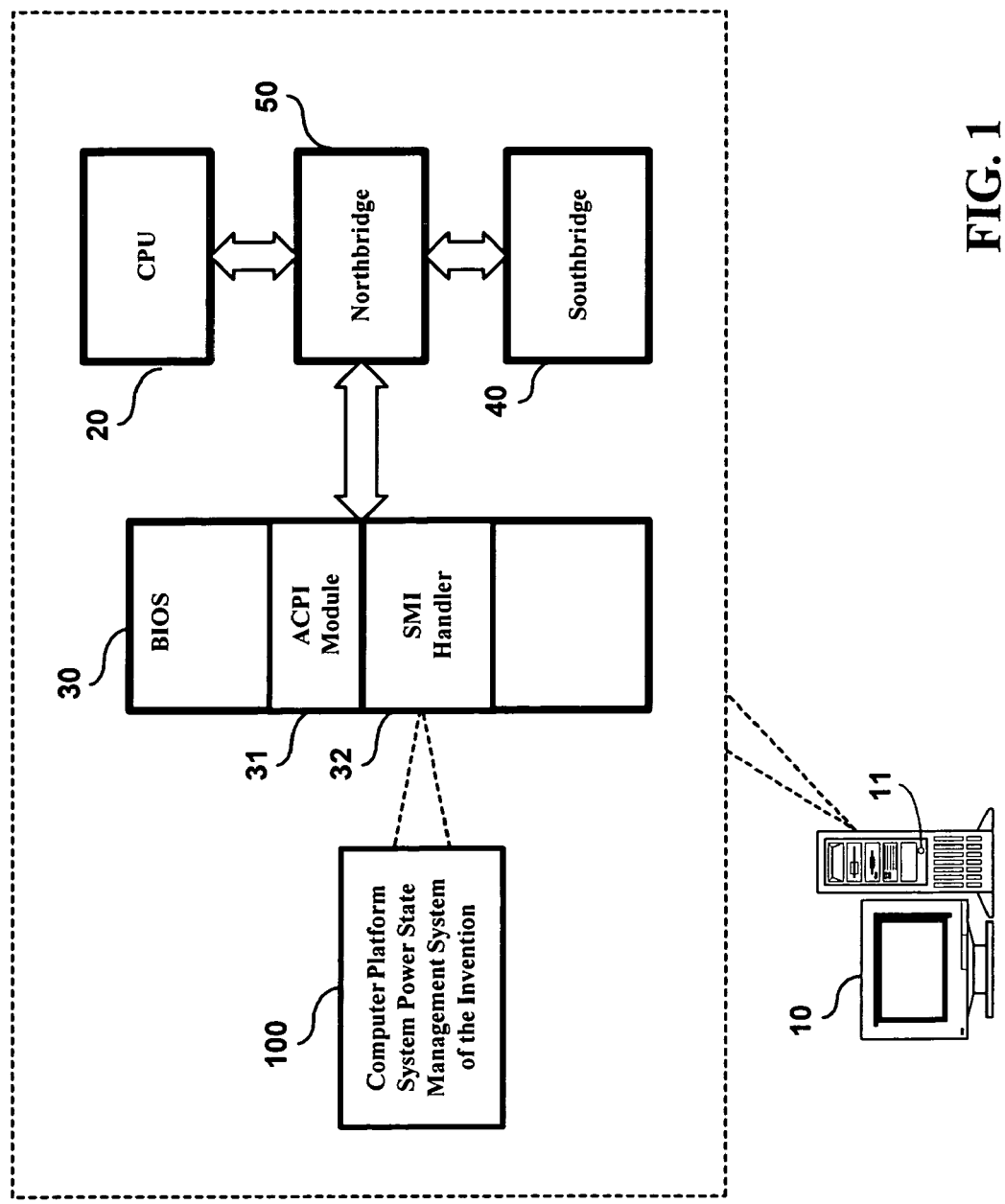
FIG. 1 is a schematic diagram showing the application of the computer platform system power state management system of the invention in conjuction with a computer platform.
Figure 3:
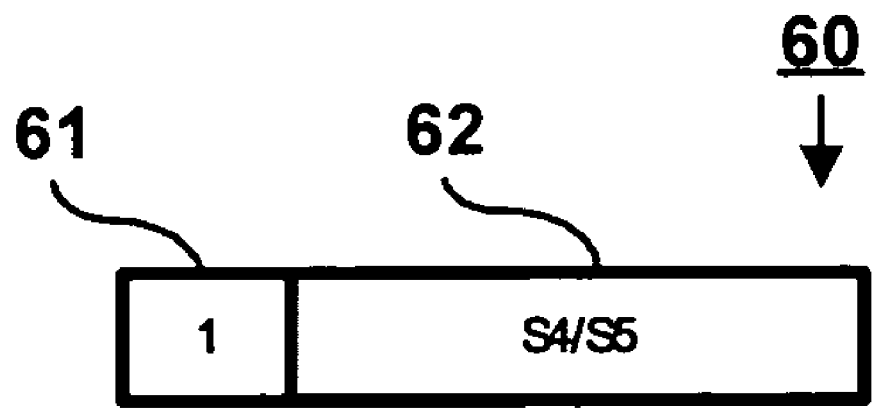
FIG. 3 is a schematic diagram showing the data structure of a sleep-type register that works in conjunction with the computer platform system power state management system of the invention.

FIG. 1 is a schematic diagram showing the application of the computer platform system power state management system according to the (which is here encapsulated in a block indicated by the reference numeral 100). As shown, the computer platform system power state management system of the invention 100 is designed for use in conjunction with a computer platform 10, such as a network server or a desktop computer, or a notebook computer, that is equipped with a CPU (Central Processing Unit) 20, a startup control unit 30, and an input/output control unit 40; where the startup control unit 30 is for example a BIOS (Basic Input/Output System) module which includes an ACPI (Advanced Configuration and Power Interface) module 31 and an SMI (System Management Interrupt) handler 32; while the input/output control unit 40 is for example a Southbridge module which is internally provided with a power-restoration state flag 41 (which is denoted by "AFTER_G3" in the document), and which is used to represent two AFTER G3 states: "ON" (for S0) and "OFF"(for S4 or S5). Furthermore, the ACPI module 31 is equipped with a sleep-type register 60 as shown in FIG. 3, which includes an enable bit 61 and a system-power-state value storage area 62. The enable bit 61 is used to store either a binary value of "1" or "0", where "1" represents an enabled state, while "0" represents a disabled state; while the system-power-state value storage area 62 is used to store a system-power-state value that represents an ACPI-specified system power state, such as S4 or S5.

In practical implementation, for example, the Southbridge module 40 can be an ICH (Input/Output Control Hub) chipset module from the Intel Corporation of USA. In the hardware architecture of the computer platform 10, a Northbridge chipset module 50 is typically connected between the Southbridge module 40 and the CPU 20. It is an important aspect of the invention that the computer platform 10 can be unequipped with a BMC (Baseboard Management Controller) module or an SIO (Super Input/Output) module, i.e., the computer platform system power state management system of the invention 100 is operable without the use of BMC and SIO modules. Since BIOS, Southbridge, Northbridge, BMC, and SIO are well-known hardware components in the computer industry, detailed description thereof will not be given in this specification.

In actual operation, the computer platform system power state management system of the invention 100 is capable of providing the computer platform 10 with an after-G3 system power state management function simply by way of the Southbridge module 40, to thereby allow the system power state of the computer platform 10 to be automatically restored to the original state prior to the abnormal power interruption; i.e., if the original system power state prior to the G3 condition is (S0, S1), then after power restoration, the system power state will be restored to (S0); and if the original system power state is (S4, S5), then after power restoration, the system power state will be restored to (S4, S5).

Figure 2:
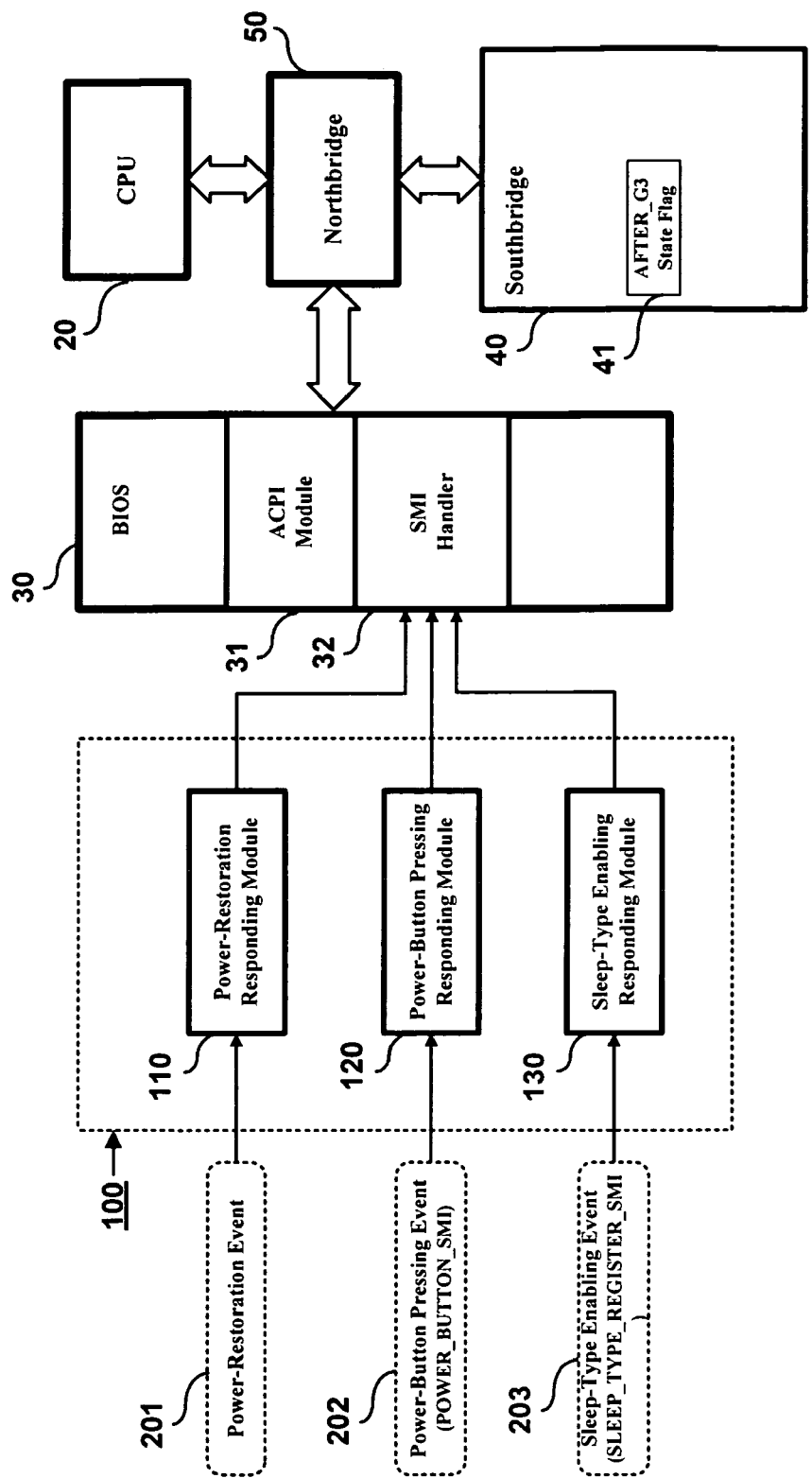
FIG. 2 is a schematic diagram showing an object-oriented component model of the computer platform system power state management system of the invention.

As shown in FIG. 2, in architecture, the computer platform system power state management system of the invention 100 is based on an object-oriented component model which comprises: (A) a power-restoration responding module 110; (B) a power-button pressing responding module 120; and (C) a sleep-type enabling responding module 130. In practical implementation, the computer platform system power state management system of the invention 100 can be fully realized by computer code and integrated as an add-on firmware module to the BIOS (Basic Input/Output System) of the computer platform 10, such that the computer code can be executed by the CPU 20 to provide the intended after-G3 system power state management function for the computer platform 10.

Firstly, the respective attributes and behaviors of the constituent components 110, 120, 130 of the computer platform system power state management system of the invention 100 are described in details in the following The power-restoration responding module 110 is capable of being activated in response to a power-restoration event 201 when a POST (Power On Self Test) is being executed on the computer platform 10 that occurs when power is restored to the computer platform 10 after an event of an abnormal power interruption. When activated, the power-restoration responding module 110 is capable of performing a power-on mode setting procedure by issuing a power-on mode setting message to the Southbridge module 40 to thereby activate the Southbridge module 40 to set its internal AFTER_G3 state flag 41 to a power-on mode value (ON).

The power-button pressing responding module 120 can operate either under ACPI mode or non-ACPI mode (legacy mode), and which is capable of responding to a power-button pressing event 202 that occurs either during or after the POST procedure by performing a power-button pressing event handling procedure for setting the internal AFTER_G3 state flag 41 of the Southbridge module 40 to a shut-off mode value (OFF). In practical implementation, for example, the power-button pressing responding module 120 is integrated to the SMI handler 32 in the BIOS module 30 for responding to a power-button SMI signal (denoted by POWER_BUTTON_SMI) that is generated by the pressing of a power button 11 on the computer platform 10. In accordance with the ACPI specification, if the power button 11 is pressed during the time when the computer platform 10 is set in power-on mode, it will cause the computer platform 10 to be set to sleep mode; and on the other hand, if pressed under sleep shut-off mode, it will cause the computer platform 10 to be reset to power-on mode.

The sleep-type enabling responding module 130 can operate either under ACPI mode or non-ACPI mode (legacy mode), and which is capable of responding to a sleep-type enabling event 203, which is initiated by the condition of the enable bit 61 of the sleep-type register 60 being set to "1" after the POST procedure is completed, by performing a sleep-type enabling event handling procedure for setting the internal AFTER_G3 state flag 41 of the Southbridge module 40 to a shut-off mode value (OFF). After this, the sleep-type enabling responding module 130 sets the computer platform 10 to a system power state, i.e., (S4, S5) based on the current sleep-mode value (S4, S5) stored in the system-power-state value storage area 62 of the sleep-type register 60. In practical implementation, for example, this sleep-type enabling responding module 130 is integrated to the SMI handler 32 in the BIOS module 30, and which is capable of being activate by a sleep-type-register enabled SMI signal (denoted by SLEEP_TYPE_REGISTER_SMI) that is generated in response to an sleep-type enabling event 203 that occurs in the condition of the enable bit 61 of the sleep-type register 60 being set to "1".

The following is a detailed description of a practical application example of the computer platform system power state management system of the invention 100 during actual operation. In this application example, it is assumed that an abnormal power interruption occurs to the computer platform 10 during normal operation, causing the ACPI global state to be set to G3; and after power is restored to the computer platform 10 (i.e., a power-restoration event 201 occurs), the BIOS module 30 is activated to perform a POST procedure and thereby activate the computer platform system power state management system of the invention 100 to perform an after-G3 system power state management function for the computer platform 10.

During the BIOS POST procedure, the power-restoration responding module 110 in the computer platform system power state management system of the invention 100 is activated in response to the power-restoration event 201 by performing a power-on mode setting procedure, wherein a power-on mode setting message is issued to the Southbridge module 40 to thereby activate the Southbridge module 40 to set its internal AFTER_G3 state flag 41 to a power-on mode value (ON). This setting allows the computer platform 10 to be set to power-on mode (ON) after power restoration. At the same time, the SMI handler 32 enables the power-button pressing responding module 120 and the sleep-type enabling responding module 130. Afterwards, in the event that the power button 11 is being pressed, it initiates a power-button pressing event 202 that causes the generation of a power-button SMI signal POWER_BUTTON_SMI which is transferred to the power-button pressing responding module 120. In response, the power-button pressing responding module 120 is activated (either under ACPI mode or non-ACPI mode) to perform a power-button pressing event handling procedure for setting the internal AFTER_G3 state flag 41 of the Southbridge module 40 to a shut-off mode value (OFF). This setting allows the computer platform 10 to be set to shut-off mode after power restoration.

After the BIOS POST procedure is completed, if the power button 11 is pressed under non-ACPI mode (i.e., legacy mode), it initiates a power-button pressing event 202 that causes the generation of a power-button SMI signal POWER_BUTTON_SMI which is transferred to the power-button pressing responding module 120. In response, the power-button pressing responding module 120 is activated under ACPI mode to perform a power-button pressing event handling procedure for setting the internal AFTER_G3 state flag 41 of the Southbridge module 40 to a shut-off mode value (OFF). This setting allows the computer platform 10 to be set to shut-off mode after power restoration. After this, if the enable bit 61 of the sleep-type register 60 is set by operating system or other software programs to an enabled state value (such as "1"), it represents the initiation of a sleep-type enabling event 203 that then causes the generation of a sleep-type-register enabled SMI signal SLEEP_TYPE_REGISTER_SMI). In response to this SMI signal, the sleep-type enabling responding module 130 is activated to perform a sleep-type handling procedure, whereby the internal AFTER_G3 state flag 41 of the Southbridge module 40 is set to shut-off mode value (OFF), and then set the computer platform 10 to S4/S5 system power state based on the current system-power-state value (S4/S5) stored in the system-power-state value storage area 62 of the sleep-type register 60.

In conclusion, the invention provides a computer platform system power state management method and system for use with a computer platform for providing the computer platform with an after-G3 system power state management function, which is characterized by the use of BIOS module's SMI (System Management Interrupt) handling functions for setting the internal AFTER_G3 state flag of a Southbridge module for the restoration of the computer platform to original ACPI system power states (S0, S4, S5) after an abnormal power interruption. This feature allows the invention to have a cross-platform capability for use on low-end computer platforms that are unequipped with BMC and SIO. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer platform system power state management method for use on a computer platform of the type having a startup control unit with a System Management Interrupt handling mechanism and an input/output control unit, where the input/output control unit includes a power-restoration state flag whose value is used to represent a particular system power state in power-on mode and a particular system power state in shut-off mode, for the purpose of providing the computer platform with a system power state management function after an event of a power interruption on the computer platform;

the computer platform system power state management method comprising:

responding to a power-restoration event that occurs after an event of a power interruption on the computer platform by performing a power-on mode setting procedure for setting the internal power-restoration state flag of the input/output control unit to a power-on mode value;

responding to a power-button pressing event by performing a power-button pressing event handling procedure via the startup control unit's System Management Interrupt handling mechanism for setting the power-restoration state flag of the input/output control unit to a shut-off mode value; and responding to a sleep-type enabling event by performing a sleep-type enabling event handling procedure via the startup control unit's System Management Interrupt handling mechanism for setting the internal power-restoration state flag of the input/output control unit to a shut-off mode value, and setting the computer platform to a system power state based on a current sleep-mode value stored in a sleep-type register.

2. The computer platform system power state management method of claim 1, wherein the computer platform is a network server.

3. The computer platform system power state management method of claim 1, wherein the computer platform is a desktop computer.

4. The computer platform system power state management method of claim 1, wherein the computer platform is a notebook computer.

5. The computer platform system power state management method of claim 1, wherein the startup control unit is a BIOS (Basic Input/Output System) module.

6. The computer platform system power state management method of claim 1, wherein the input/output control unit is a Southbridge chipset module.

7. A computer platform system power state management system for use with a computer platform of the type having a startup control unit with a System Management Interrupt handling mechanism and an input/output control unit, where the input/output control unit includes a power-restoration state flag whose value is used to represent a particular system power state in power-on mode and a particular system power state in shut-off mode, for the purpose of providing the computer platform with a system power state management function after an event of a power interruption on the computer platform;

the computer platform system power state management system comprising:

a power-restoration responding module, which is capable of responding to a power-restoration event that occurs after an event of a power interruption on the computer platform by performing a power-on mode setting procedure for setting the internal power-restoration state flag of the input/output control unit to a power-on mode value;

a power-button pressing responding module, which is capable of responding to a power-button pressing event by performing a power-button pressing event handling procedure via the startup control unit's System Management Interrupt handling mechanism for setting the power-restoration state flag of the input/output control unit to a shut-off mode value; and a sleep-type enabling responding module, which is capable of responding to a sleep-type enabling event by performing a sleep-type enabling event handling procedure via the startup control unit's System Management Interrupt handling mechanism for setting the internal power-restoration state flag of the input/output control unit to a shut-off mode value, and setting the computer platform to a system power state based on a current sleep-mode value stored in a sleep-type register.

8. The computer platform system power state management system of claim 7, wherein the computer platform is a network server.

9. The computer platform system power state management system of claim 7, wherein the computer platform is a desktop computer.

10. The computer platform system power state management system of claim 7, wherein the computer platform is a notebook computer.

11. The computer platform system power state management system of claim 7, wherein the startup control unit is a BIOS (Basic Input/Output System) module.

12. The computer platform system power state management system of claim 7, wherein the input/output control unit is a Southbridge chipset module.

* * * * *